United States Patent [19]

McElhaney et al.

[11] Patent Number: 5,149,971
[45] Date of Patent: Sep. 22, 1992

[54] SCINTILLATOR ASSEMBLY FOR ALPHA RADIATION DETECTION AND METHOD OF MAKING THE ASSEMBLY

[75] Inventors: Stephanie A. McElhaney; Martin L. Bauer, both of Oak Ridge; Marion M. Chiles, Koxville, all of Tenn.

[73] Assignee: Martin Marietta Energy Systems, Inc., Oak Ridge, Tenn.

[21] Appl. No.: 642,252

[22] Filed: Jan. 16, 1991

[51] Int. Cl.$^5$ .......................... G01T 1/20; C09K 11/54
[52] U.S. Cl. .................................. 250/361 R; 250/368
[58] Field of Search .................. 250/361 R, 367, 368, 250/370.02, 253, 369, 370.11; 252/301.65

[56] References Cited

U.S. PATENT DOCUMENTS

| | | | |
|---|---|---|---|
| 3,032,659 | 5/1962 | Bacon et al. | 250/361 R |
| 3,935,462 | 1/1976 | de Luca et al. | 250/369 |
| 3,950,647 | 4/1976 | Piltingsrud | 250/361 R |
| 4,107,534 | 8/1978 | Piltingsrud | 250/368 |
| 4,362,946 | 12/1982 | Chsano et al. | 250/367 X |
| 5,006,713 | 4/1991 | Miller et al. | 250/361 R |

FOREIGN PATENT DOCUMENTS

| | | | |
|---|---|---|---|
| 261612 | 6/1964 | Australia | 250/361 R |
| 1249507 | 11/1960 | France | 250/361 R |
| 55-82071 | 6/1980 | Japan | 250/368 |
| 691925 | 5/1953 | United Kingdom | 250/361 R |

Primary Examiner—Constantine Hannaher
Assistant Examiner—Edward J. Glick
Attorney, Agent, or Firm—George L. Craig; Harold W. Adams

[57] ABSTRACT

A scintillator assembly for use in the detection of alpha radiation includes a body of optically-transparent epoxy and an amount of phosphor particles embedded within the body adjacent one surface thereof. When making the body, the phosphor particles are mixed with the epoxy when in an uncured condition and permitted to settle to the bottom surface of a mold within which the epoxy/phosphor mixture is contained. When the mixture subsequently cures to form a hardened body, the one surface of the body which cured against the bottom surface of the mold is coated with a thin layer of opaque material for preventing ambient light form entering the body through the one surface. The layer of opaque material is thereafter coated with a layer of protective material to provide the assembly with a damage-resistant entrance window.

19 Claims, 3 Drawing Sheets

SCINTILLATOR ASSEMBLY FOR ALPHA RADIATION DETECTION AND METHOD OF MAKING THE ASSEMBLY

This invention was made with Government support under Contract No. DE-AC05-84OR21400 awarded by the U.S. Department of Energy to Martin Marietta Energy Systems, Inc. and the Government has certain rights in this invention.

BACKGROUND OF THE INVENTION

This invention relates generally to the detection of alpha radiation and relates, more particularly, to instruments used in the detection of alpha radiation.

Conventional alpha scintillation survey instruments commonly include an optically-transparent light pipe which is optically coupled to the front of a photomultiplier tube. Disposed across the light pipe opposite the photomultiplier tube is a thin layer of phosphor, such as silver-activated zinc sulfide. During use of such an instrument, alpha particles interact with the phosphor layer to create light photons which, in turn, are guided by the light pipe onto the photomultiplier tube. In order to protect the photomultiplier tube from saturation by ambient visible light, the instrument is commonly housed in a metal casing and covered with a thin, opaque radiation entrance window.

The entrance window is relatively thin to permit the passage of alpha particles and to avoid any significant reduction of kinetic energy possessed by the particles as they pass through the window. Entrance windows of conventional alpha scintillation instruments commonly are provided by a layer of aluminized Mylar ® possessing a thickness of about 6.35 micrometers (i.e., about 0.25 mil). Mylar ® material possessing such a thickness is known to provide a satisfactory opaque shield against ambient light and is thin enough for most alpha particles to penetrate. However, such a window is relatively fragile and is easily punctured, torn or scratched. In order to render a conventional survey instrument more durable for use in field environments, the fragile entrance window may be replaced with a meshed Mylar ® window screen or a micromachined silicon wafer may be incorporated Within the instrument to obviate the fragile entrance window. However, neither of the instruments which result from the aforementioned use of the meshed window screen or micromachined silicon wafer have been found to be both highly efficient and suitably rugged. It would be desirable to provide an instrument for the detection of alpha radiation which combines both high efficiency and ruggedness.

Accordingly, it is an object of the present invention to provide a new and improved scintillator assembly for use in an alpha radiation detector which promotes high efficiency during operation of the instrument and is sufficiently rugged for use in field environments and a method of making the assembly.

SUMMARY OF THE INVENTION

This invention resides in a scintillator assembly for use in the detection of alpha radiation and a method of making the assembly.

The scintillator assembly includes a body having a front surface against which alpha particles desired to be detected impinge and includes an optically-transparent medium and an amount of phosphor embedded within the optically-transparent medium adjacent the front surface of the body. The front surface is coated by a relatively thin layer of opaque material for preventing ambient light from entering the body through the front surface thereof, and the layer of opaque material is coated by a layer of protective material which is transparent to alpha particles moving through the protective material layer to provide the assembly with a damage-resistent entrance window.

The method of making the scintillator includes the steps of providing a mold having an interior having a relatively smooth bottom surface, providing an amount of phosphor in particle form, and providing an amount of optically-transparent medium in an uncured condition wherein the optically-transparent medium has a relatively low viscosity when in its uncured condition and is curable to a hardened condition. The amount of phosphor is mixed with the uncured amount of optically-transparent medium, and the resulting phosphor/medium mixture is placed within the mold. A major portion of the phosphor is then permitted to settle within the optically-transparent medium to the bottom surface of the mold, and the mixture is then permitted to cure to form a hardened body. The hardened body is thereafter removed from the mold and the surface of the body which cured against the bottom surface of the mold (providing the front surface of the body in the scintillator assembly) is coated with a relatively thin layer of opaque material to prevent ambient light from entering the body through the body surface. The layer of opaque material is subsequently coated with a layer of protective material to provide the assembly with a damage-resistant entrance window.

DETAILED DESCRIPTION OF AN ILLUSTRATED EMBODIMENT

Figure 1:
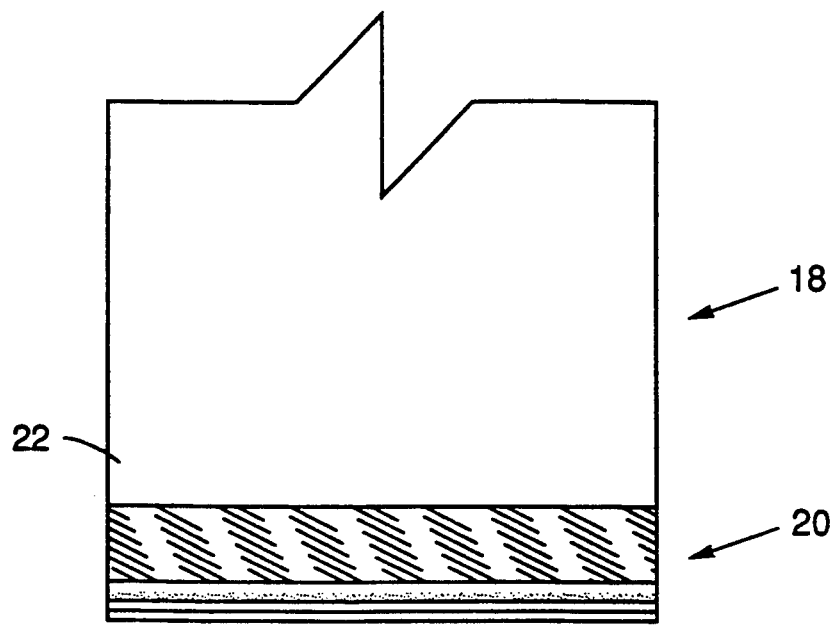
FIG. 1 is a fragmentary transverse cross-sectional view of an embodiment of a scintillator detector assembly in accordance with the present invention.
Figure 2:
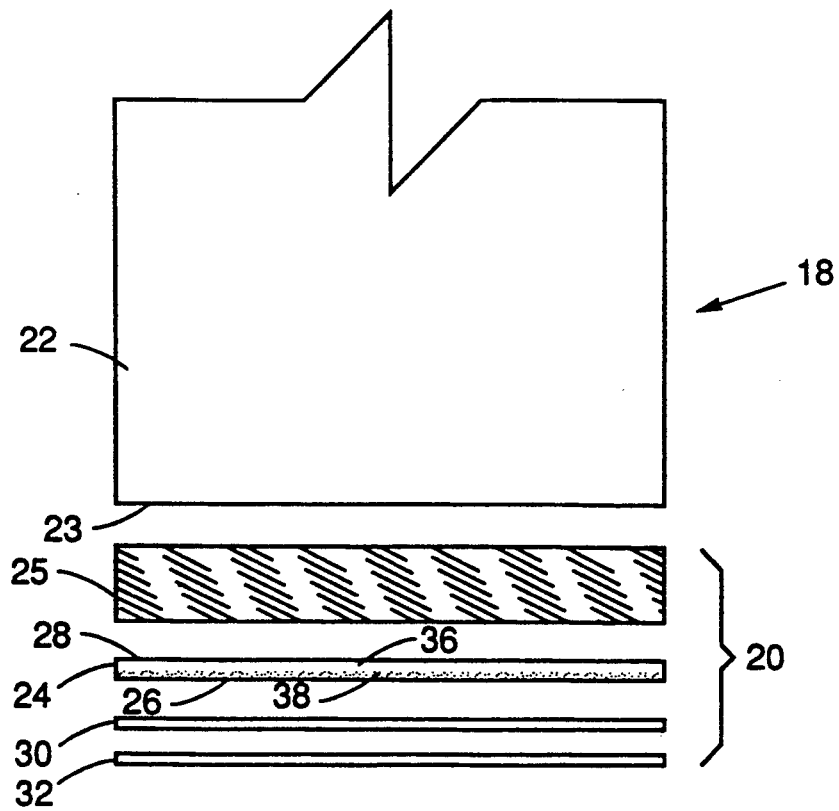
FIG. 2 is a view of the FIG. 1 assembly similar to that of FIG. 1, shown exploded.

With reference to FIGS. 1, and 2, there is shown an instrument 18 for use in the detection of alpha radiation and within which an embodiment of a scintillator assembly, indicated 20, is incorporated. In addition to the assembly 20, the instrument 18 includes a photomultiplier tube 22 and an amount of phosphor material, described herein, positioned in front of the tube 22. During operation of the instrument 18, particles of alpha radiation interact with the phosphor material to create photons, and the created photons are guided, or focused, onto the front, indicated 23 in FIG. 2, of the photomultiplier tube 22. The means and methods by which the created photons are sensed with the photomultiplier tube are well known in the art so that a more detailed description of the detection component of the instrument 18 is not believed to be necessary.

The scintillator assembly 20 is mounted in the instrument 18 in front of the photomultiplier tube 22 and includes the aforementioned amount of phosphor used in the creation of photons upon interaction with alpha particles. In this connection, the assembly 20 includes a body 24 having a smooth front surface 26 and an opposite back surface 28. A light pipe 25 is attached to the back surface 28 and interposed between the body 24 and the photomultiplier tube 22. The front surface 26 of the body 24 is coated with a layer 30 of opaque material, whose purpose is set forth in greater detail herein, and the opaque material layer 30 is, in turn, coated with a layer 32 of protective material.

The body 24 of the assembly 20 includes an optically-transparent medium 36, such as an optically-transparent epoxy within which an amount of phosphor 38 is embedded. More specifically, the phosphor 38 is embedded within the body 24 so that a major portion of the phosphor amount is positioned adjacent the front surface 26. The epoxy 36 is comprised of a resin and a hardener which when mixed and in an uncured condition, possesses a relatively low viscosity. The amount of phosphor 38 is added to and mixed with the low-viscosity epoxy in a powdered form and permitted to gravitationally settle within the mixture before the epoxy cures to a hardened condition. When, therefore, the epoxy 36 subsequently cures to a hardened condition to form the body 24, the major portion of phosphor 38 is collected in a layer adjacent the lowermost surface of the hardened mixture. In order, therefore, that the phosphor 38 is gravitationally collected adjacent the front surface 26 of the body 24 during the formation of the body 24, the body 24 is molded with its front surface 26 facing downwardly.

An example of an epoxy suitable for use as the optically-transparent medium of the body 24 is available under the trade designation Eccobond 27 from Emerson & Cummings, Inc. of Canton, Massachusetts. Preferably, the phosphor 38 of the body 24 is silver-activated zinc sulfide [ZnS(Ag)] having a particle size of about twelve micrometers. Silver-activated zinc sulfide possesses desirable qualities as an alpha-sensitive medium and when utilized in the body 24, enhances the collection efficiency of the photomultiplier tube 22. During formation of a body 24 (described in greater detail herein) wherein a phosphor layer possessing a thickness of about 0.13 cm (0.05 inches) is desired, an amount of phosphor powder is mixed with the epoxy so that upon settling within the mixture, about 7.0 milligrams per square centimeter of phosphor powder is deposited along the lower surface of the mixture.

Figure 3:
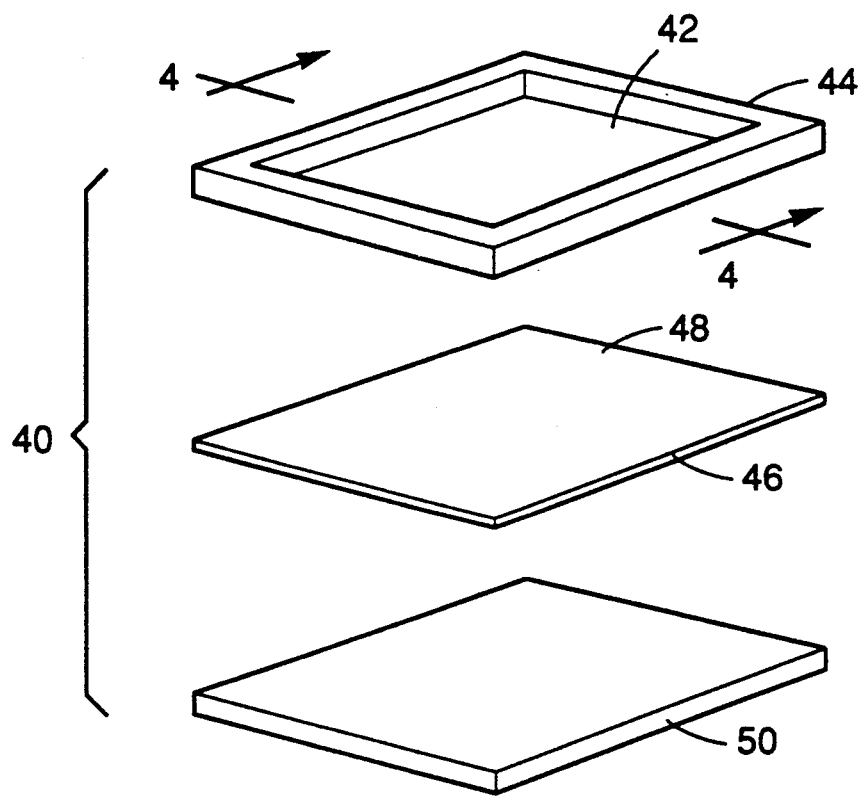
FIG. 3 is an exploded perspective view of a mold used in connection with the making of a component of the FIG. 1 assembly.
Figure 4:
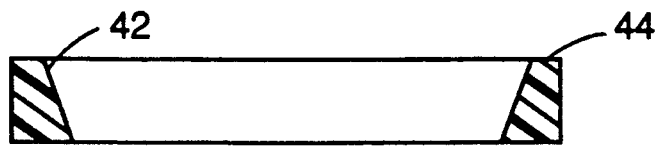
FIG. 4 is a cross-sectional view taken along line 4—4 of FIG. 3.

To form the body 24 and with reference to FIG. 3, a mold 40 is prepared for holding a mixture of uncured epoxy and phosphor. Such a mold 40 may be prepared by machining a substantially square opening 42 in a block of polyethylene or tetrafluoroethylene, such as is available under the trade designation Teflon from E. I. du Pont de Nemours & Company, Inc., of Wilmington, Delaware to form a frame 44 for the mold 40. For present purposes, the opening 42 in the illustrated frame 44 as measured across its upper surface is about 4.219 inches by 4.219 inches (i.e., 100 square centimeters), and the inside surfaces of the frame 44 are milled at about a forty-five degree angle between the top and bottom surfaces as best shown in FIG. 4.

To form a bottom for the mold 40, a suitably-sized piece 46 is cut from a sheet of material, preferably of a type which is available under the trade designation Mylar® from E. I. du pont, de Nemours & Co., Inc. and which is a polyester film. One side, indicated 48 in FIG. 3, of the Mylar piece 46 is then coated with a thin layer of a mold release agent, such as that which is available under the trade designation Ram Mold Release 225 from Ram Chemicals of Garcena, California. During a coating operation, the Mylar piece 46 is preferably attached to a spinner (not shown) and rotated so that the one side 48 of the piece 46 to which the mold release agent is to be applied is spun about its center at about 3,000 revolutions per minute. The mold release agent (in a liquid form) is then applied to the center of the side 48 of the spinning piece 46 so that the spinning action of the piece 46 coats the side 48 with the release agent and slings excess release agent from the side 48.

The one side 48 of the piece 46 is then coated with an opaque material of the type desired to provide the layer 30 for the body 24. In the depicted embodiment, the opaque material used for coating the piece side 48 is aluminum and is applied to the piece side 48 by an evaporation process so that the thickness of the aluminum coating upon the piece side 48 is about 2000 angstroms. The aluminum-coated piece 46 is then tightly stretched across a glass plate 50 (measuring 6.0 inches across its face) so that the aluminum-coated side 48 of the Mylar piece 46 faces away from the plate 50. When stretching the Mylar piece 46 onto the plate 50, care should be is taken to ensure that no dust particles are trapped between the piece 46 and the plate 50.

Figure 5:
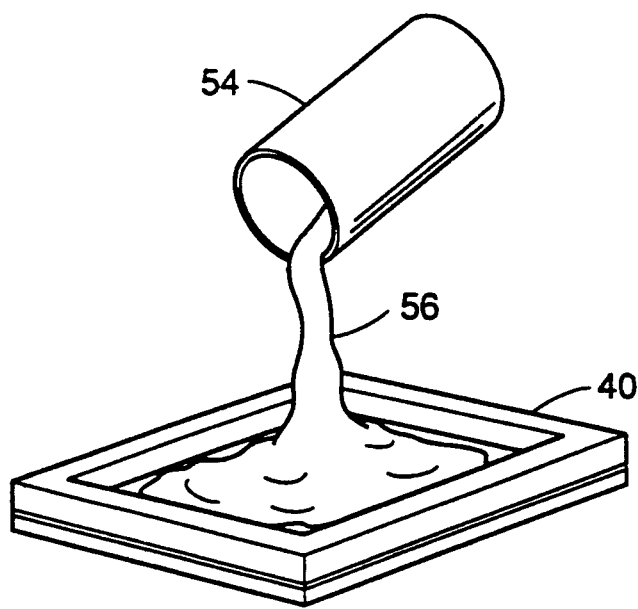
FIGS. 5 and 6 are views illustrating various steps involved in making the FIG. 1 assembly.

The mold frame 44 is then placed upon and attached to the aluminum-coated piece 46 to form the assembled mold 40, best shown in FIG. 5. Attachment of the mold frame 44 to the aluminum-coated piece 46 is effected with a double-sided tape or some other adhesive positioned between the periphery of the piece 46 and the lower side of the frame 44. Preferably, the attachment of the frame 44 to the piece 46 forms a sealed bond therebetween to prevent leakage from the interior of the mold when the mold 40 is used. It follows that the sidewalls of the interior of the assembled mold 40 is provided by the inside surfaces of the frame and the bottom of the mold interior is provided by the aluminum coating of the piece 46.

As mentioned earlier, the medium 36 with which the body is formed is optically-transparent in its hardened, or cured, tate and in the depicted embodiment is comprised of the aforementioned Eccobond 27 epoxy from Emerson & Cummings, Inc. The phosphor used in the formation of the body 24 is ZnS(Ag) having a particle size of about 12 micrometers is well-suited for use in the body 24.

With reference to FIG. 5, an amount of uncured epoxy is mixed with a smaller amount of phosphor in a separate container 54 before the epoxy/phosphor mixture 56 is poured into the mold 40. At the outset of such a mixing operation, the aforementioned Eccobond 27 (comprised of a resin and a hardener), 18.5 grams of resin is mixed with 5.6 grams of hardener in the container 54, and then about 800 milligrams of the ZnS(Ag) (12 micrometer particle size) are added to the epoxy mixture. The three parts are then gently mixed together while care is taken to minimize the formation of air bubbles within the mixture. Preferably, the epoxy should be thoroughly mixed and the phosphor uniformly distributed throughout the epoxy mixture.

The epoxy/phosphor mixture 56 is then poured into the mold 40 as shown in FIG. 5. With the aforementioned amounts of resin, hardener and phosphor, the mixture 56 forms a relatively thin layer within the mold 40 having a thickness of about 0.13 cm (0.05 inches). The mold 40, with the mixture 56, is then placed within an oven set at 60 degrees Centigrade and permitted to heat for about thirty minutes, positioned within the oven for only about thirty minutes, the epoxy does not cure and its viscosity remains low enough that the phosphor particles satisfactorily settle to the bottom of the epoxy/phosphor mixture 56. At the end of the thirty minutes, the mold 40 is removed from the oven.

Figure 6:
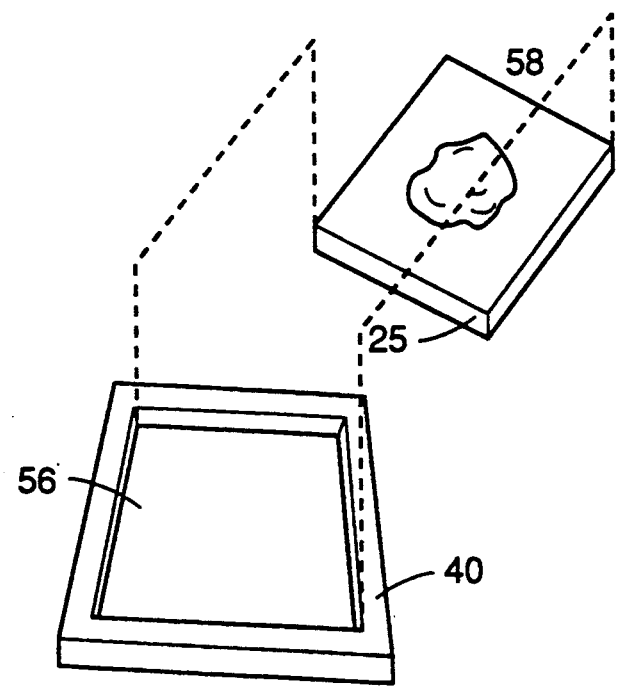

The light-pipe 25 illustrated in FIG. 6 is constructed of methyl methacrylate and in the depicted embodiment, is in the form of a solid block measuring about 4.219 inches by about 4.219 inches by about 0.4375 inches. With the mixture 56 in at least a partially cured condition within the mold 40, the light-pipe 25 is attached to the upper surface of the body with a suitable epoxy, such as the aforementioned Eccobond 27. In the illustrated embodiment, 10.3 grams of resin and 3.1 grams hardener of Eccobond 27 are mixed together in a suitable container and subsequently applied as a mixture 58 to the center of one side of the light-pipe 25 as shown in FIG. 7. The light-pipe 25 is then placed epoxy-side down into the mold 40 containing the partially-cured epoxy/phosphor mixture 56 so that the epoxy mixture applied to the light-pipe 2 spreads across the upper surface of the mixture 56. With the epoxy mixture 58 sandwiched between the mixture 56 and light-pipe 25, the mixture 58 forms a bonding layer which is substantially free of air pockets.

The mold contents are then permitted to cure to a hardened condition, although the contents of the mold 40 will cure satisfactorily if left undisturbed overnight, the mold 40 may be placed in an oven to reduce the time normally necessary for curing.

Upon curing of the mold contents to a hardened condition, the piece 46 is gently peeled from the hardened mixture 56, or more specifically, from the front surface 26 of the hardened body 24 so that the aluminum with which the piece side 48 was coated remains attached to the front surface 26. The body 24 is then removed from the mold frame 44 and prepared for the application of additional aluminum on the front surface 26. To this end, a thin layer of mold release agent is applied to the front surface in a spin-coating process. In particular, the body 24 is attached to a spinner (not shown), and its front surface 26 is spun about its center at about 3000 revolutions per minute. The mold release agent is then deposited upon the center of the spinning surface 26 so that the spinning action of the body 24 slings the mold release agent across the front surface 26.

With a thin layer of mold release agent applied to the aluminized front surface 26, an additional layer of aluminum is applied to the front surface 26 by an evaporation process (i.e., e-beam evaporation) so that the additional layer of aluminum has a thickness of about 2000 angstroms. The steps of spin-coating a thin layer of mold release agent onto the front surface 26 and applying an additional layer (about 2000 angstroms in thickness) of aluminum to the front surface 26 are thereafter repeated until the total thickness of the aluminum applied to the front surface 26 is completely light-tight. It has been found that an aluminum coating possessing a thickness of about 8000 angstroms provides the front surface 26 with satisfactory light-tight characteristics.

The aluminum coating (indicated 30 in FIGS. 1 and 2) applied to the front surface 26 of the body 24 is thereafter coated with a layer 32 of hardcoat material in a spin-coating process. In this connection, the body 24 is attached to a spinner (not shown) and rotated so that the aluminum-coated front surface 26 rotates about its center at about 3000 rpms. An uncured amount of hardcoat material such as cyanoacrylate available under the designation Zip Grip 4404 from Devcon Corporation is then deposited upon the center of the front surface 26 so that the spinning action of the body 24 coats the aluminum layer 3 with the hardcoat material and slings off of the body 24 any excess hardcoat material. The layer 32 of hardcoat is thereafter permitted to cure to complete the assembly 20, and the assembly 20 is optically-attached to the photomultiplier tube 22 in a manner well-known in the art.

The resulting scintillator assembly 20 is advantageous in that its entrance window, provided by the hardcoat layer 32, is resistant to scratches, tears, punctures and other forms of physical damage and is resistant to many types of chemicals which may damage conventional scintillator assemblies. Hence, the assembly 20 is well-suited for use in field environments. Moreover, the assembly 20 is watertight and suitable for use in high humidity areas and liquid or wastewater streams. In addition, the components of the assembly 20 are commercially available at relatively low costs thus rendering the material cost of the assembly 20 relatively low. Furthermore, the assembly 20 may be manufactured in the size, shape or form required by the application or to retrofit existing alpha scintillator detector units. Still further, the overall efficiency of the assembly 20 has been found to be greater than conventional scintillator assemblies and is advantageous in this respect.

It will be understood that numerous modifications and substitutions can be had to the aforementioned embodiments without departing from the spirit of the invention. For example, although the application of opaque material, e.g. aluminum, to the front surface 26 of the assembly body 24 has been shown and described as effected by e-beam evaporation, the opaque material may be effected by sputtering, anodization, diffusion or chemical reaction in accordance with the broader aspects of the invention. Accordingly, the aforementioned embodiments are intended for the purpose of illustration and not as limitation.

We claim:

1. A scintillator assembly for use in the detection of alpha radiation comprising:
    an optically transparent body having a front surface against which alpha particles desired to be detected impinge, said body having a phosphor layer embedded within the front surface;
    a thin layer of opaque material disposed directly upon the embedded phosphor in the front surface for preventing ambient visible light from entering the body through the front surface; and
    a layer of protective material, which is transparent to alpha particles moving through the protective material layer, disposed directly upon the opaque material layer to provide the assembly with a damage-resistant window.

2. The assembly of claim 1 wherein the phosphor is silver-activated zinc sulfide.

3. The assembly of claim 2 wherein the silver-activated zinc sulfide is in a powder and is uniformly distributed across the front surface of the body.

4. The assembly of claim 1 wherein the opaque material is chosen from the group consisting of aluminum and an opaque dye.

5. The assembly of claim 4 wherein the opaque material is aluminum and the thickness of the opaque material layer is about 8000 angstroms.

6. The assembly of claim 1 wherein the protective material is chosen from a group consisting of cyanoacrylate, a polyamide, a plastic and an epoxy.

7. The assembly of claim 1 wherein said body has a back surface opposite the front surface and said assembly further includes a light-pipe coupled to the back surface.

8. The assembly of claim 7 wherein said light-pipe is comprised of methyl methacrylate.

9. In an instrument for the detection of alpha radiation including a phosphor material with which alpha particles interact to create photons and a photomultiplier tube onto which the created photons are guided, the improvement comprising:
a scintillator assembly positioned in front of a photomultiplier tube including
a) an optically transparent body having a front surface against which alpha particles desired to be detected impinge, said body having the phosphor material embedded within the front surface,
b) a thin layer of opaque material coating the front surface and contacting the phosphor material for preventing the front surface from being struck by ambient light ;and
c) a layer of protective material which is transparent to alpha particles moving through the protective material layer coating the opaque material layer to provide the assembly with a damage-resistant entrance window.

10. The improvement of claim 9 wherein the phosphor is silver-activated zinc sulfide.

11. The improvement of claim 9 wherein the opaque material is chosen from the group consisting of aluminum and an opaque dye.

12. The improvement of claim 9 wherein said body has a back surface opposite the front surface and the improvement further comprises a methyl methacrylate light-pipe interposed between the back surface of the body and the photomultiplier tube.

13. A method of making a component for generating photons upon the interaction with alpha particles in an instrument for use in the detection of alpha radiation comprising the steps of:
providing a mold having an interior having a smooth bottom surface;
providing an amount of phosphor in particle form;
providing an amount of optically-transparent medium in an uncured condition wherein the optically-transparent medium has a low viscosity when in its uncured condition and is curable to a hardened condition;
mixing the amount of phosphor with the uncured amount of optically-transparent medium to uniformly distribute the phosphor in the medium;
placing the resulting phosphor/medium mixture within the mold;
permitting the amount of phosphor to settle within the optically-transparent medium to the bottom surface of the mold;
permitting the phosphor/medium mixture to cure to form a hardened body.

14. The method of claim 13 wherein the step of placing is preceded by a step of coating the bottom surface of the mold with a layer of opaque material of the type with which the surface of the hardened body is coated so that upon removing the hardened body from the mold, the opaque material adheres to the phosphor settled in the surface of the hardened body which cured against the bottom surface.

15. The method of claim 14 including the steps of coating the opaque material adhering to the phosphor with a damage resistant material.

16. The method of claim 13 wherein said step of permitting the phosphor/medium mixture to cure provides the hardened body with a relatively flat surface opposite the surface which cured against the bottom surface of the mold and is followed by the steps of:
providing a light-pipe having a flat surface; and
optically attaching the flat surface of the light-pipe to said flat surface of the hardened body.

17. The method as defined in claim 13 wherein the step of permitting the phosphor/medium mixture to cure is followed by the steps of:
removing the hardened body from the mold;
coating the surface of the hardened body which cured against the bottom surface of the mold with a relatively thin layer of opaque material to prevent ambient light from entering the body through the body surface; and
coating the layer of opaque material with a layer of protective material to provide the assembly with a damage-resistant entrance window.

18. The method of claim 17 wherein the step of coating the surface of the hardened body with an opaque material is effected by an evaporation process.

19. The method of claim 17 wherein the step of coating the layer of opaque material with a layer of protective material is effected by a spin-coating process.

* * * * *